US012427527B2

(12) United States Patent
Dehgan et al.

(10) Patent No.: US 12,427,527 B2
(45) Date of Patent: Sep. 30, 2025

(54) SYSTEMS AND METHODS USING HAND-HELD DEVICES FOR DETECTING A TARGET ANALYTE LOADED ON A CARTRIDGE

(71) Applicant: CONSERVATION X LABS, INC., Washington DC, WA (US)

(72) Inventors: Alex Dehgan, Washington, WA (US); Paul Bunje, Studio City, CA (US); Hallie Holmes, Seattle, WA (US); David Baisch, Seattle, WA (US); Cifeng Fang, Redmond, WA (US); Gareth Fotouhi, Seattle, WA (US); Misa Winters, Brier, WA (US)

(73) Assignee: CONSERVATION X LABS, INC., Washington, DC (US)

(*) Notice: Subject to any disclaimer, the term of this patent is extended or adjusted under 35 U.S.C. 154(b) by 0 days.

(21) Appl. No.: 18/038,995

(22) PCT Filed: Dec. 21, 2021

(86) PCT No.: PCT/US2021/064745
§ 371 (c)(1),
(2) Date: May 26, 2023

(87) PCT Pub. No.: WO2022/140479
PCT Pub. Date: Jun. 30, 2022

(65) Prior Publication Data

US 2023/0390779 A1 Dec. 7, 2023

Related U.S. Application Data

(60) Provisional application No. 63/128,198, filed on Dec. 21, 2020.

(51) Int. Cl.
*B01L 7/00* (2006.01)

(52) U.S. Cl.
CPC ......... *B01L 7/52* (2013.01); *B01L 2200/0689* (2013.01); *B01L 2200/142* (2013.01); *B01L 2300/041* (2013.01)

(58) Field of Classification Search
CPC .................. B01L 2200/0689; B01L 2200/142
See application file for complete search history.

(56) References Cited

U.S. PATENT DOCUMENTS 5,527,510 A 6/1996 Atwood et al.
2002/0109838 A1* 8/2002 Columbus .............. B01L 3/508 356/246

(Continued)

OTHER PUBLICATIONS

International Search Report and Written Opinion mailed on May 9, 2022, for International Application No. PCT/US2021/064745 filed on Dec. 21, 2021, 8 pages.

(Continued)

*Primary Examiner* — Natalia Levkovich
(74) *Attorney, Agent, or Firm* — EcoTech Law Group, P.C.

(57) ABSTRACT

Systems and methods relating thereto for detecting target analytes, using hand-held detection devices and compression mechanisms, are described. An exemplar hand-held detection device includes a cartridge inlet and a cartridge stage for securing cartridge containing the sample including the target-analyte. The device further comprises a compression assembly including a pressing surface. In an open state of the compression assembly, the pressing surface is released, displacing away from the cartridge stage, and thereby allowing a cartridge inlet to provide access to an unobstructed loading path for the cartridge to be secured on the cartridge stage. Upon receiving an external pressing force on the pressing surface, the compression assembly is designed to acquire a compressed state, in which the pressing surface displaces towards the cartridge stage and the (Continued)

compression assembly seals off the cartridge present inside the cartridge stage from an environment around the cartridge stage.

16 Claims, 12 Drawing Sheets

(56) References Cited

U.S. PATENT DOCUMENTS

| | | | | |
|---|---|---|---|---|
| 2003/0138353 | A1 | 7/2003 | Bargoot et al. | |
| 2006/0051253 | A1 | 3/2006 | Gausepohl | |
| 2006/0115380 | A1 * | 6/2006 | Kagan ................ | G01N 35/0098 422/400 |
| 2009/0114044 | A1 | 5/2009 | Godfrey et al. | |
| 2013/0004388 | A1 | 1/2013 | Gagne et al. | |

OTHER PUBLICATIONS

Office Action received for Canada Patent Application No. 3,198,157, mailed on Nov. 2, 2023, pp. 5.

* cited by examiner

SYSTEMS AND METHODS USING HAND-HELD DEVICES FOR DETECTING A TARGET ANALYTE LOADED ON A CARTRIDGE

RELATED APPLICATIONS

This application is a National Stage Application of International Application No. PCT/US2021/064745, filed on Dec. 21, 2021, which further claims priority to U.S. Patent Application Ser. No. 63/128,198, filed on Dec. 21, 2020, which is incorporated herein by reference for all purposes.

FIELD

The present arrangements and teachings relate to portable and hand-held detection devices, and methods relating thereto, for testing samples containing a target analyte (e.g., viruses such as severe acute respiratory syndrome SARS-CoV-2 ("COVID-19") virus, harmful bacteria and chemical constituents of interest, and/or RNA, DNA, and/or protein for purposes of species identification). More specifically, the present arrangements and teachings relate to a device, and methods relating thereto, that use novel opening, closing, and compression mechanisms and features, for sealing off removable cartridges that are used to test for presence and/or characteristics of a target analyte in a biological sample.

BACKGROUND

Testing samples containing one or more target analytes, and in particular, biological samples with one more target nucleic acids, has been a staple of biology laboratories for many decades. The advent of quantitative real-time PCR (qPCR) made the identification of and measurement of genetic targets accessible and practical for a greater number of analytical tests and applications. This allows for the presence and/or characteristics of a target to be monitored through a reaction driven by external thermal energy input (e.g., thermomechanical energy). A computer-controlled reaction chamber is used to precisely control the reaction temperature for a desired method. Optical sensors, placed in a separate detection chamber, are used to measure the signal emitted by target analytes during the reaction method.

Conventional systems and methods have been used in professional laboratory settings, wherein sample preparation and data analysis has been performed by experts trained to use sophisticated equipment in laboratory settings that also provide access to various storage conditions for reaction materials (e.g., refrigerators) to practice these systems and methods. Demands for diagnostic testing in resource-limited areas that do not have access to such laboratory settings and personnel, however, remain. Unfortunately, conventional systems and methods encounter difficulties in maintaining relatively closed reaction conditions when carrying out reactions, including but not limited to optical detection reactions, in the field.

What is, therefore, needed are systems and methods facilitate testing of target analytes without encountering the drawbacks associated with the conventional systems and methods of testing.

SUMMARY

To this end, the present arrangements and teachings offer different types of systems, and methods relating thereto, that allow an automated, sample-to-result methodology that may be performed by non-expert users and provide immediate results in the field. Specifically, the present arrangements and teachings offer, inside a hand-held detection device, provisions for sealing off reactions for tests that determine presence and/or characteristics of one or more target analytes (including but not limited to biological samples having one more target nucleic acids or proteins). The present arrangements and methods use removable cartridges that are configured to seal off reactions from ambient conditions, to prevent evaporation during thermal processing, and to maintain pressure for such reactions that provide immediate results in the field.

In one aspect, the present arrangements provides hand-held detection devices for sealing off a removable cartridge. One such exemplar hand-held detection device includes a cartridge inlet designed to receive the cartridge and a cartridge stage coupled to or extending from the cartridge inlet and being designed to have secured therein the cartridge.

The exemplar hand-held detection device further includes a compression assembly disposed adjacent to the cartridge stage and includes a pressing surface. In an open state of the compression assembly, the pressing surface is released from a closed state and thereby displaces at least a portion of the compression assembly away from the cartridge stage, allowing a cartridge access through an unobstructed loading path to be secured on the cartridge stage. Upon receiving an external pressing force on the pressing surface, the compression assembly is designed to acquire a compressed state, in which the pressing surface displaces towards the cartridge stage and the compression assembly seals off the cartridge present inside the cartridge stage from an environment around the cartridge stage.

The exemplar hand-held detection device further still includes a switch that is communicatively coupled to the pressing surface of the compression assembly. In this configuration, upon receiving an external switching force, the switch places the pressing surface in the open state and the compression assembly is in a non-operational state. Further, when the pressing surface receives an external pressing force and is placed in a closed state, the pressing surface places the compression assembly in the compressed state or in an operational state.

In certain embodiments of the preferred arrangements, the switch further includes an engaging end coupled to a first horizontal spring and has defined therein a locking aperture. A protruding portion of a locking plate occupies the locking aperture.

Further, the cartridge stage may include a cartridge-receiving aperture for securing the removable cartridge. The cartridge-receiving aperture receives the cartridge containing the target analyte and when a compression module, as explained below in greater detail, of the compression assembly compresses against the cartridge, the cartridge-receiving aperture serves to stabilize and prevent displacement of the cartridge under compression.

The locking plate has preferably defined therein a central aperture and at least two guide-posting-engaging apertures. In this configuration, the central aperture is part of an optical pathway and is designed to allow for optical detection of a target analyte disposed inside the cartridge. The two guide-post-engaging apertures are disposed adjacent to the central aperture. Further, each of the guide-post-engaging apertures have passing therethrough a guide post that is connected to the pressing surface. By way of example, a first guide post passes through a first guide-post-engaging aperture and a second guide post passes through a second guide-post engaging aperture.

In preferred implementations of these arrangements, the pressing surface is connected to at least two of the guide posts, each of which comprises a washer and a shaft. The washers are disposed at one end of the shafts and the shafts pass through the guide-post-engaging apertures. In the open state of the pressing surface, presence of the washer prevents vertical displacement of the shaft beyond a position of the guide-post-engaging aperture such that the pressing surface remains coupled to the guide-post-engaging apertures of the locking plate during the open state of the pressing surface. In other words, the washer prevents the subassembly of the guide post and the compression assembly, including the pressing surface, from being disassembled from the other components of the hand-held detection device during the open state of the pressing surface.

Continuing with these preferred implementations, the shaft may have substantially circumferentially defined thereon at least one groove such that, in the compressed state of the compression assembly, inner edges of each of the guide-post-engaging apertures engage with respective ones of the grooves to maintain the compressed state of the compression assembly. In other implementations, the shaft is not of cylindrical shape, and the groves are defined on the outer surface of the shaft to allow for engagement with guide-post-engaging apertures.

Each of the guide posts, preferably, have disposed therearound a bearing and a vertical spring. The vertical spring is disposed between the bearing and the pressing surface. In these preferred implementations, the bearings are designed to not vertically displace with vertical displacement of the guide posts. Rather, the bearings are designed to guide vertical displacement of the guide posts through the bearings. When the compression assembly transitions from the non-operational state to the operational state, the vertical springs undergo compression between the bearing and the pressing surface. When the compression assembly transitions from the operational state to the non-operational state, the vertical springs undergo decompression between the bearing and the pressing surface. Preferably, force supplied by such decompression of the vertical springs pushes the top surface of the compression assembly away from a cartridge.

The hand-held detection device of the present arrangements may further include a switch frame disposed adjacent to the locking plate. The switch frame houses at least a portion of the switch therein. In this arrangement, the bearing and the vertical spring are disposed between the pressing surface and the switch frame. Further, the switch frame has preferably defined therein vertical displacement apertures through which the guide posts undergo vertical displacement as the compression assembly transitions between the non-operational state and the operational state. Such vertical displacement apertures may also be part of an optical pathway designed to allow for optical detection of a target analyte disposed inside a cartridge.

In the operational state of the compression assembly, the inner edges of guide-post-engaging apertures engage with the grooves defined on the guide posts to prevent vertical displacement of the guide posts. In this operational state, the vertical springs operate to spring load the respective one of the guide posts. When the compression assembly transitions from the operational state to the non-operational state, the inner edges of the guide-post-engaging apertures undergo disengagement from the grooves and allowing vertical displacement of the guide posts. Further, during the transition from the operational state to the non-operational state, the vertical springs undergo decompression, springing forward towards the pressing surface, thereby pushing the pressing surface away from the cartridge stage, and thereby forcing the pressing surface to acquire an open state.

When the compression assembly transitions from the operational state to the non-operational state, the switch undergoes displacement such that the locking aperture of the switch displaces the protruding portion of the locking plate. In one embodiment of the present arrangements, displacement of the protruding portion of the locking plate disengages inner edges of the guide-post-engaging apertures from the grooves of the guide posts.

The above-mentioned switch frame may house the first horizontal spring, which is coupled to the switch. In this configuration, when the switch receives the external switching force and is displaced from its original position to a new position, the engaging end of the switch causes spring loading of the first horizontal spring and almost contemporaneously, causes displacement of the locking aperture, which in turn causes displacement of the protruding portion, which in turn disengages the inner edges of the guide-post-engaging apertures from the grooves. The present teachings recognize that the switch in these arrangements, upon cessation of the external switching force, is designed to return from the new position to the original position under a spring unloading action of the first horizontal spring.

The switch frame preferably houses a second horizontal spring that engages with a spring engaging end of the locking plate such that in the compressed state of the compression assembly, a spring loading action of the second horizontal spring maintains engagement of the guide-post-engaging apertures of the locking plate with the grooves. In the open state of the pressing surface or the non-operational state of the compression assembly, the spring loading action of the second horizontal spring maintains engagement of the guide-post-engaging apertures with an outer surface of the shafts.

In this open state, the guide-post-engaging apertures are not engaged with the grooves of the shaft, but are contacting and/or engaged with a non-grooved portion of the shaft such that upon receiving the external pressing force at the pressing surface, the grooves of the shaft (of the guide posts) vertically displace towards the locking plate until the grooves engage with inner edge of the guide-post-engaging apertures of the locking plate. As a result, the spring loading action of the second horizontal spring forces engagement of the grooves with inner edges of the guide-post-engaging apertures.

In certain preferred embodiments of the present hand-held devices, the compression assembly includes a compression module and a retractable housing including the pressing surface. The retractable housing is coupled to and houses at least a portion of the compression module such that upon receiving the external pressing force on the pressing surface, the compression module acquires the compressed state, in which the compression module seals off the cartridge present inside the cartridge stage. The guide posts are housed inside the retractable housing.

These preferred embodiments further include an ingress seal coupled to the retractable housing such that when the compression assembly is in the compressed state, the ingress seal operates in conjunction with the cartridge stage to seal off access through the cartridge stage.

In another aspect, the present teachings offer methods for detecting a target analyte. One such exemplar method includes obtaining a hand-held target-analyte detection device and a cartridge containing a target analyte. The hand-held target-analyte detection device includes a switch, a compression assembly, a cartridge stage, and a cartridge inlet.

Next, the exemplar detecting method proceeds to activating the switch and placing the compression assembly in a non-operational state. In this non-operational state, a pressing surface of the compression assembly is released, displacing away from the cartridge stage and thereby providing an unobstructed loading path for the cartridge to be secured inside the cartridge stage. In other words, in an open state of the pressing surface, the compression assembly is non-operational and therefore in a non-operational state.

The exemplar detecting method then includes loading the cartridge through the cartridge inlet and receiving the cartridge inside the cartridge stage to form a loaded cartridge stage.

Then, the exemplar detecting method involves pressing the pressing surface of the compression assembly towards the loaded cartridge stage and thereby sealing off access through the cartridge stage. As a result, the pressing step provides a relatively closed environment, protecting the cartridge and/or other internal components of the device from the environment outside of the device.

In those embodiments of the present arrangements where the compression assembly includes or is coupled to an ingress seal, the above-mentioned pressing step includes forcing the ingress seal towards the cartridge stage to seal off access through the cartridge stage. This also may protect the cartridge and/or other internal components of the device from the environment outside of the device.

In yet another aspect, the present teachings provide methods for assembling hand-held detection devices of different arrangements. One such exemplar method includes obtaining a compression assembly having at pressing surface and at least two guide posts. In this configuration of the compression assembly, the guide posts are coupled to the pressing surface and the guide posts include a shaft and washer.

The exemplar assembling method then involves assembling a locking plate including at least two guide-post-engaging apertures and a switch frame. The switch frame includes at least two vertical displacement apertures such that at least two of the guide-post-engaging apertures and at least two of the vertical displacement apertures are aligned to allow vertical displacement of the shafts.

Next, the exemplar assembling method includes passing at least two terminating ends of at least two of the guide posts through at least two of the guide-post-engaging apertures and at least two of the vertical displacement apertures.

The exemplar assembling method may finally conclude with a step that involves installing at least two washers on at least two of the terminating ends to secure at least two of the guide-post-engaging apertures and at least two of the vertical displacement apertures within at least two of the shafts.

The construction and method of operation of the present arrangement and present teachings, however, together with additional objects and advantages thereof, will be best understood from the following descriptions of specific embodiments when read in connection with the accompanying figures that described below.

BRIEF DESCRIPTIONS OF THE DRAWINGS

DETAILED DESCRIPTION OF THE PREFERRED EMBODIMENTS

Figure 1:
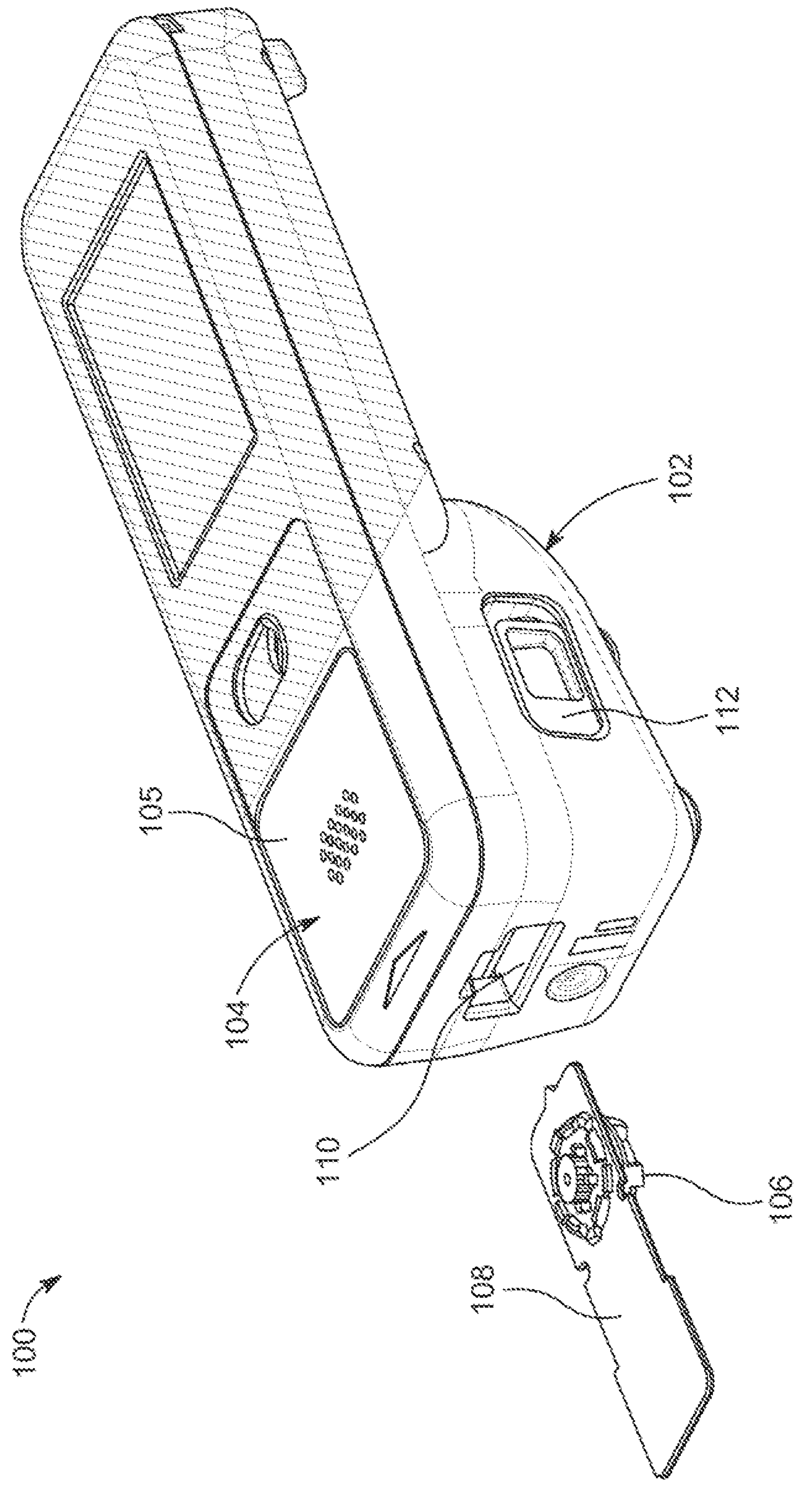
FIG. 1 shows a perspective view of a hand-held detection device, according to one embodiment of the present arrangements, and a cartridge containing a target analyte that undergoes detection in the hand-held detection device.

In the following description, numerous specific details are set forth in order to provide a thorough understanding of the present arrangements and teachings. It will be apparent, however, to one skilled in the art that the present teachings may be practiced without limitation to some or all of these specific details. In other instances, well-known method steps have not been described in detail in order to not unnecessarily obscure the present arrangements and teachings.

The systems and methods of the present inventions use or provide a simple, integrated method and a portable, hand-held detection device for performing and facilitating reactions involving a target analyte (e.g., determining presence or characteristics of a target analyte, such as by way of non-limiting example, DNA, RNA, or protein). The handheld target-analyte detection device allow for reactions performed inside a removable cartridge having one more target analytes disposed therein. A cartridge may be thought of as a structure or combination of structures for carrying out one or more such reactions (e.g., in one or more reaction wells disposed within the cartridge). Use of such removable cartridges provides certain advantages, including the convenience of pre-loading cartridges in a laboratory setting with reagents, buffers, probes, and other materials used for target-analyte testing, such that a user in the field, where a target analyte is collected, may carry out target-analyte testing in the field with loading of such components into or on a cartridge carried out previously, in a laboratory setting, and/or by more technically trained individuals. Such cartridges may be comprised of optically translucent material such that the contents and reactions therein are monitored by optical detection carried out in such devices.

The present teachings, however, recognize that reactions carried out using such cartridges may be inaccurate, unreliable, and/or inconsistent, insofar as cartridges may not maintain relatively closed conditions during a target-analyte reaction, such that the reaction is not sealed off from ambient conditions, evaporation may occur, and/or pressure and/or temperature levels may be difficult to maintain. Accordingly, the systems and methods of the present arrangements and teachings provide the advantage of sealing off such cartridges during reactions in a target-analyte detecting device so as to maintain a relatively closed environment during such reactions. Preferably, such cartridges are comprised of compressible material to facilitate their compression using the systems and methods of the present teachings.

Such sealing and compression may prevent ingress or egress into or out of the cartridge (e.g., at or near regions where components may be loaded into a cartridge; or at regions where discrete cartridge components are coupled or engaged), thus maintain a relatively closed environment for reactions inside of a cartridge. By way of example, a cartridge may contain a base portion that is loaded and a cap portion that is then secured on the cap portion after loading; a target-analyte detection reaction performed inside the cartridge may supply pressure forces that cause "leaks" of moisture or other matter from the cartridge, e.g., in areas where the cap portion and base portion of an exemplar cartridge are coupled together, or in a loading area on the cartridge. The present teachings recognize, however, that providing compressive force on the cartridge during such reactions facilitates maintaining a relatively closed environment for the reaction.

In one aspect, the present arrangements and teachings disclose a hand-held detection device for sealing off a removable cartridge. The hand-held detection device preferably includes several key components. For example, the hand-held detection device includes a cartridge inlet designed to receive the cartridge within hand-held devices of the present teachings and arrangements.

As another example, the hand-held detection device includes a cartridge stage that is coupled to or extending from the cartridge inlet, such that the cartridge stage is designed to have the cartridge secured therein or thereon.

As another example, the hand-held detection devices of the present teachings and arrangements include a compression assembly, which has a pressing surface disposed adjacent to a cartridge stage. According to one embodiment of the present arrangements, a compression assembly is in a "non-operational state," before the cartridge is loaded inside the device. In this non-operational state, the compression assembly is displaced away from the cartridge stage, which provides a cartridge access through a cartridge inlet and along an unobstructed loading path within the device for the cartridge to be secured in or on the cartridge stage. In this non-operational state of the compression assembly, the pressing surface of the compression device is open and therefore deemed to be in an "open state."

According to another embodiment of the present arrangements, however, a compression assembly is in a "compression state," such that the compression assembly compresses a cartridge secured in a cartridge stage. This compressed state is also known as an operational state of the compression assembly. Preferably, the transformation from a non-operational state to an operational state of the compression assembly is facilitated by an external pressing force being applied to the pressing surface of the compression assembly. When an external force is received at the pressing surface, the pressing surface displaces towards a cartridge stage, placing the compression assembly in a compression state to seal off the cartridge present inside the cartridge stage from an environment around the cartridge stage. This "compression state" of a compression assembly may also be thought of as a an "operational" state of the compression assembly, insofar as a target analyte inside a cartridge preferably undergoes a target-analyte-detection reaction while the cartridge is being compressed by the compression assembly during this compressed state.

Hand-held devices of the present arrangements and teachings also include a switch that is communicatively coupled to a pressing surface of a compression assembly such that when the switch receives an external switching force, the switch places the pressing surface in an open state and the compression assembly in a non-operational state, and when the pressing surface receives an external pressing force to acquire a closed state, the pressing surface places the compression assembly in a compressed or state. In certain embodiments of the present arrangements, a switch is mechanically coupled to a pressing surface of a compression assembly. In other embodiments of the present arrangements, however, a switch is electrically, magnetically, and/or digitally coupled to a pressing surface.

FIG. 1 shows some of these salient features of a system 100, according to one preferred embodiment of the present arrangements, for detecting a target analyte. System 100 includes a handheld detection device 102 for sealing off a removable cartridge 106 containing the target analyte. Hand-held detection device 102 includes a compression assembly 104 with a pressing surface 105, a cartridge inlet 110, and a switch 112. Cartridge 106 is secured on a cartridge card 108.

Cartridge 106 is preferably comprised of optically translucent material that provides an optical pathway therethrough during optical detection reactions carried out in the cartridge. Cartridge 106 is also preferably comprised of compressible material to facilitate its compression using the systems and methods of the present teachings so as to seal off the cartridge during reactions, including optical detection reactions, carried out in such cartridges using the present devices.

Cartridge card 108 is an optional feature that facilitates handling and transfer of cartridge 106 into and out of the devices of the present arrangements and teaching by providing a handling surface.

Figure 2A:
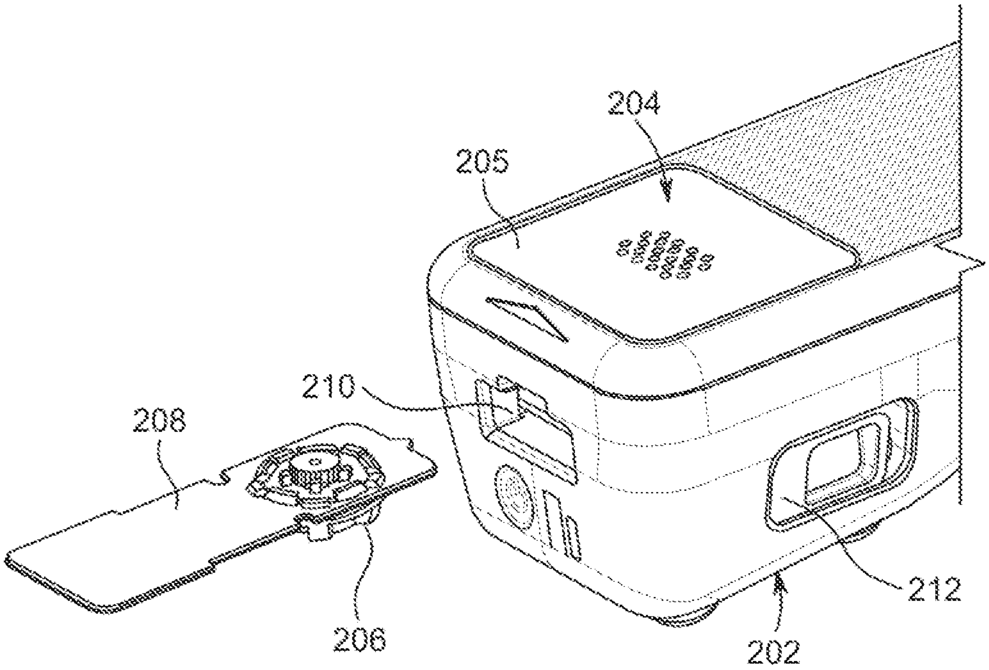
FIG. 2A shows a perspective view of a cartridge inlet and a compression assembly portions, according to one preferred embodiment of the present arrangements, of the hand-held detection device of FIG. 1.
Figure 2B:
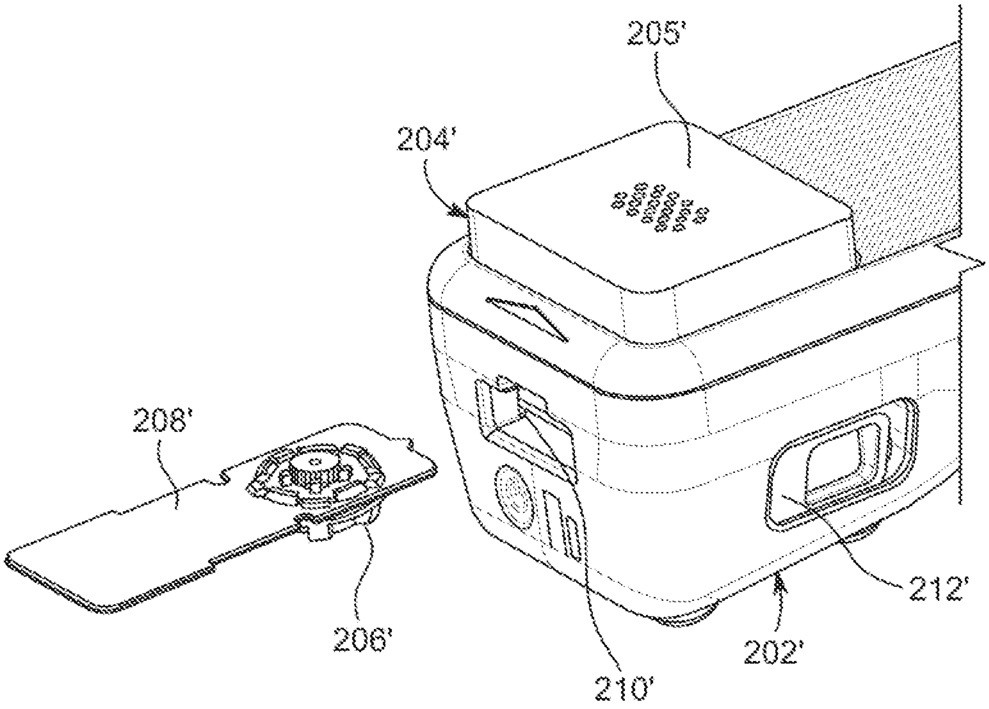
FIG. 2B shows a perspective view of the cartridge inlet and the compression assembly portions of FIG. 2A and shows a pressing surface of the compression assembly in an open state.
Figure 2C:
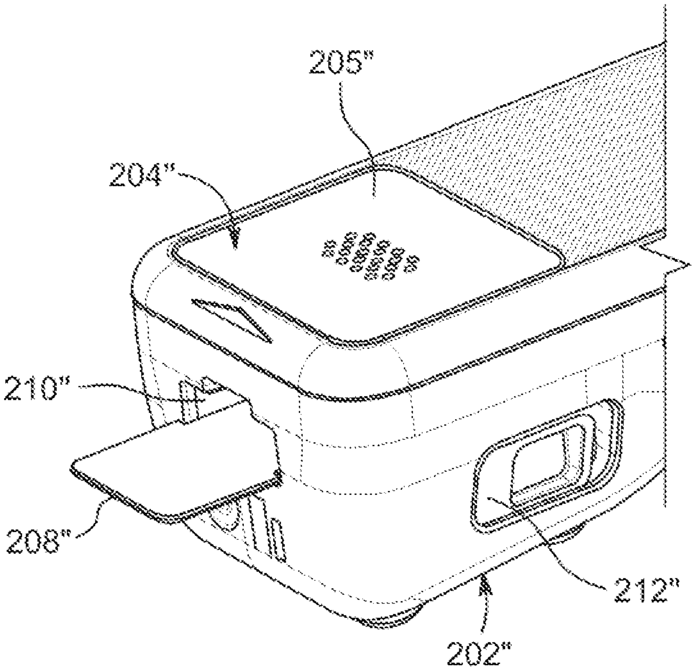
FIG. 2C shows a perspective view of the cartridge inlet and the compression assembly portions of FIG. 2A and shows the cartridge shown in FIGS. 1, 2A, and 2B loaded into the cartridge inlet of FIGS. 1, 2A, and 2B with the compression assembly in a compressed and operational state and the pressing surface in a closed state.

FIGS. 2A-2C shows a compression assembly, e.g., compression assembly 104 of FIG. 1, at different states, according to preferred embodiments of the present teachings and arrangements, i.e., at a "storage state" of a hand-held detection device 202 (FIG. 2A), at an open state, or a non-operational state, of a compression assembly 204' of a device 202' (FIG. 2B), and at a compressed state, or an operational state, of a compression assembly 204" of a device 202" (FIG. 2C).

In FIG. 2A, device 202, a compression assembly 204, a pressing surface 205, a cartridge 206, a cartridge card 208, a cartridge inlet 210, and a switch 212, are the same as their counterparts in FIG. 1, i.e., device 102, compression assembly 104, pressing surface 105, cartridge 106, cartridge card 108, cartridge inlet 110, and switch 112, respectively.

FIG. 2A shows hand-held detection device 202 in a storage state, according to one embodiment of the present arrangements. In the storage stage, hand-held detection device 202 is at an initial stage before the device goes into an operational state. Further, in storage stage, the compression assembly of hand-held detection device 202 is held in a compressed state so as to not allow contaminants to enter hand-held detection device 202. FIG. 2A also shows a cartridge 206 disposed on a cartridge card 208 and placed outside hand-held device 202 before undergoing processing (e.g., detection of target analyte contained inside cartridge 206).

Specifically, by pressing surface 205 having a closed state, access through a cartridge stage is blocked through cartridge inlet 210 (explained in further detail below with reference to ingress seal 322' and cartridge stage 314' of FIG. 3B) and/or past pressing surface 205, which is in a closed state. In such manner, device 202 may be thought of as being in a "storage" stage, because the device is non-operational, and connection to an outside environment is blocked through cartridge inlet 210 by a closed state of pressing surface 205' and/or past pressing surface 205, which is in a closed state, protecting internal components of device 202 during storage.

FIG. 2B shows hand-held detection device 202' in a non-operational state, according to one embodiment of the present arrangements, with a cartridge 206' still outside of hand-held device 202', but ready for loading inside hand-held detection device 202'. In FIG. 2B, device 202', a compression assembly 204', a pressing surface 205', a cartridge 206', a cartridge card 208', a cartridge inlet 210', and a switch 212', are substantially similar to their counterparts in FIG. 2A, i.e., device 202, compression assembly 204, pressing surface 205, cartridge 206, a cartridge card 208, cartridge inlet 210, and switch 212. Unlike with device 202 of FIG. 2A, however, FIG. 2B shows pressing surface 205' in an open state, which provides an unobstructed loading path beyond cartridge inlet 210' for cartridge 206' to be secured on a cartridge stage inside device 202'.

As explained in further detail below with reference to FIGS. 4A-4B, transformation of pressing surface 205' from a closed state to an open state is triggered by switch 212', which is communicatively coupled to pressing surface 205' of compression assembly 204', such that upon receiving an external switching force, switch 212' places pressing surface 205' in an open state and compression assembly 204' is maintained in a non-operational state, without having cartridge 206' present therein.

FIG. 2C shows hand-held device 202", according to one embodiment of the present arrangements, with a cartridge (not shown to simplify illustration) being compressed therein. In FIG. 2C, device 202", compression assembly 204", a pressing surface 205", a cartridge card 208", a cartridge inlet 210", and a switch 212", are substantially similar to their counterparts in FIG. 2B, i.e., device 202', compression assembly 204', pressing surface 205', cartridge card 208', cartridge inlet 210', and switch 212'.

As shown in the embodiment of FIG. 2C, compression assembly 204" is in a compressed state, and pressing surface 205" is in a closed state, with a cartridge (not visible in FIG. 2C) secured within device 202". Preferably, transformation of a compression assembly from a non-operational state (as shown by compression assembly 204' of FIG. 2B) to a compression state (as shown by compression assembly 204" of FIG. 2C) is achieved by applying an external pressing force on pressing surface 205" such that components of the compressing assembly that are directly and indirectly connected to pressing surface 205" are displaced towards a cartridge stage (e.g., cartridge stage 314' of FIG. 3B), and such that compression assembly 204" seals off a cartridge secured inside a cartridge stage (not visible in FIG. 2C) from an environment around the cartridge stage.

Figure 3A:
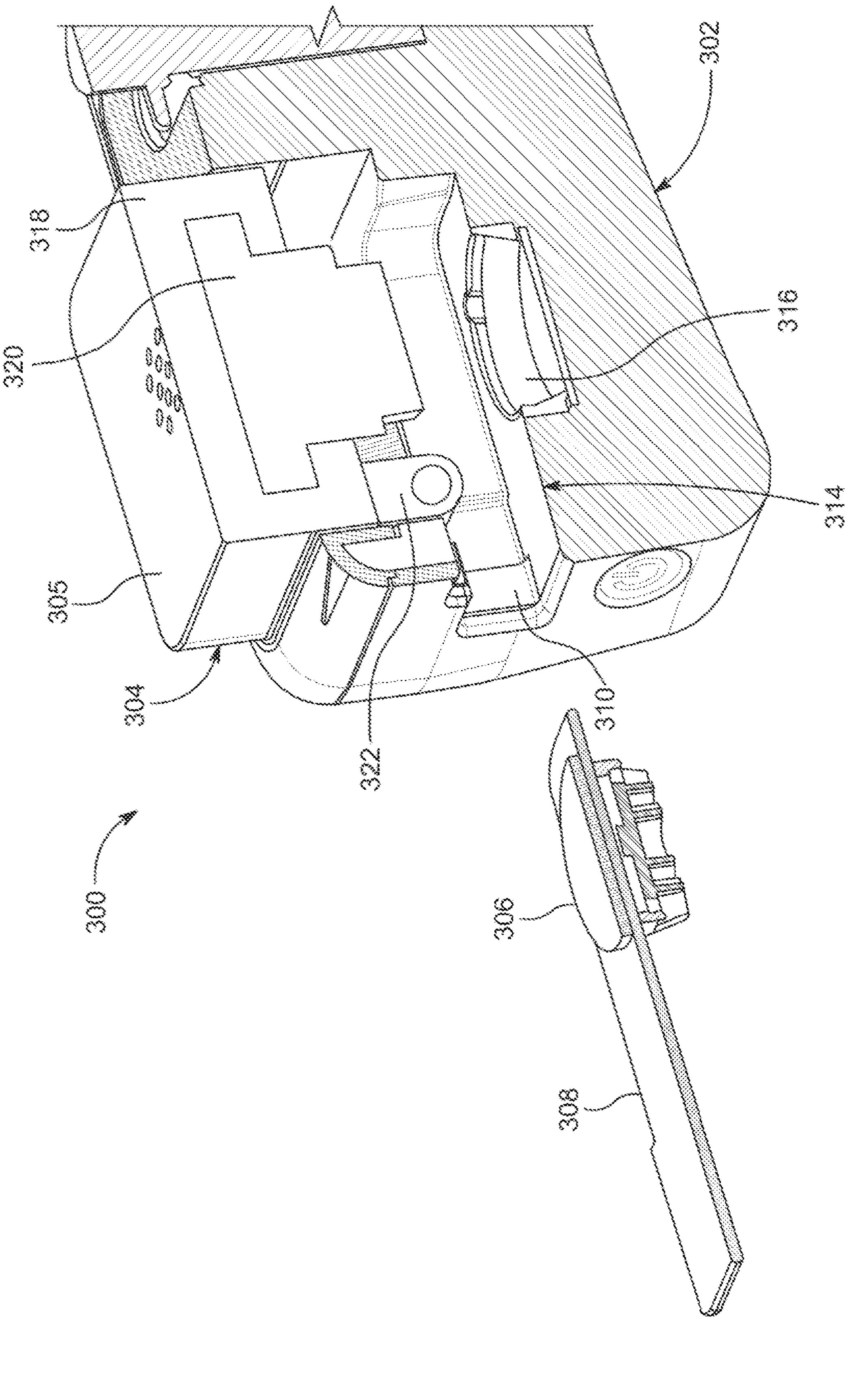
FIG. 3A shows a side-sectional view of a certain salient components of the hand-held detection device, according to one embodiment of the present arrangements, with a cartridge, disposed on a cartridge card and prior to being loading inside the hand-held detection device.

FIG. 3A is a side-sectional view of a system 300, according to one embodiment of the present arrangements, that includes a hand-held device 302, and a removable cartridge 306 disposed on a cartridge card 308 outside of device 302. FIG. 3A shows salient components of compression assembly 304 disposed inside device 302 and involved in sealing off removable cartridge 306. To this end, FIG. 3A shows device 302 having a compression assembly 304 that includes a pressing surface 305, a retractable housing 318, a compression module 320, and an ingress seal 322; and a cartridge inlet 310 leading to a cartridge stage 314 with a cartridge-receiving aperture 316 as part of the cartridge stage. Device 302, compression assembly 304, pressing surface 305, cartridge 306, cartridge card 308, and a cartridge inlet 310, are substantially similar to their counterparts in FIG. 2B, i.e., device 202', compression assembly 204', pressing surface 205', cartridge card 206', cartridge 208', and cartridge inlet 210'. As with the embodiment of FIG. 2B, FIG. 3A shows compression assembly 304 in a non-operational state with pressing surface 305 in an open state.

According to one preferred embodiment of the present arrangements, compression assembly 304 includes retractable housing 318 (which includes pressing surface 305) and compression module 320. Preferably, retractable housing 318 is coupled to and houses at least a portion of compression module 320 such that upon pressing surface 305 receiving an external pressing force, compression module 320 will acquire a compressed state in which compression module 320 seals off a cartridge present in cartridge stage 314 (as shown in FIG. 3B). In other words, compression module 320 seals off a cartridge by compressing the cartridge, preferably against a cartridge stage, and preferably during target-analyte detection reactions processed in the cartridge.

Figure 3B:
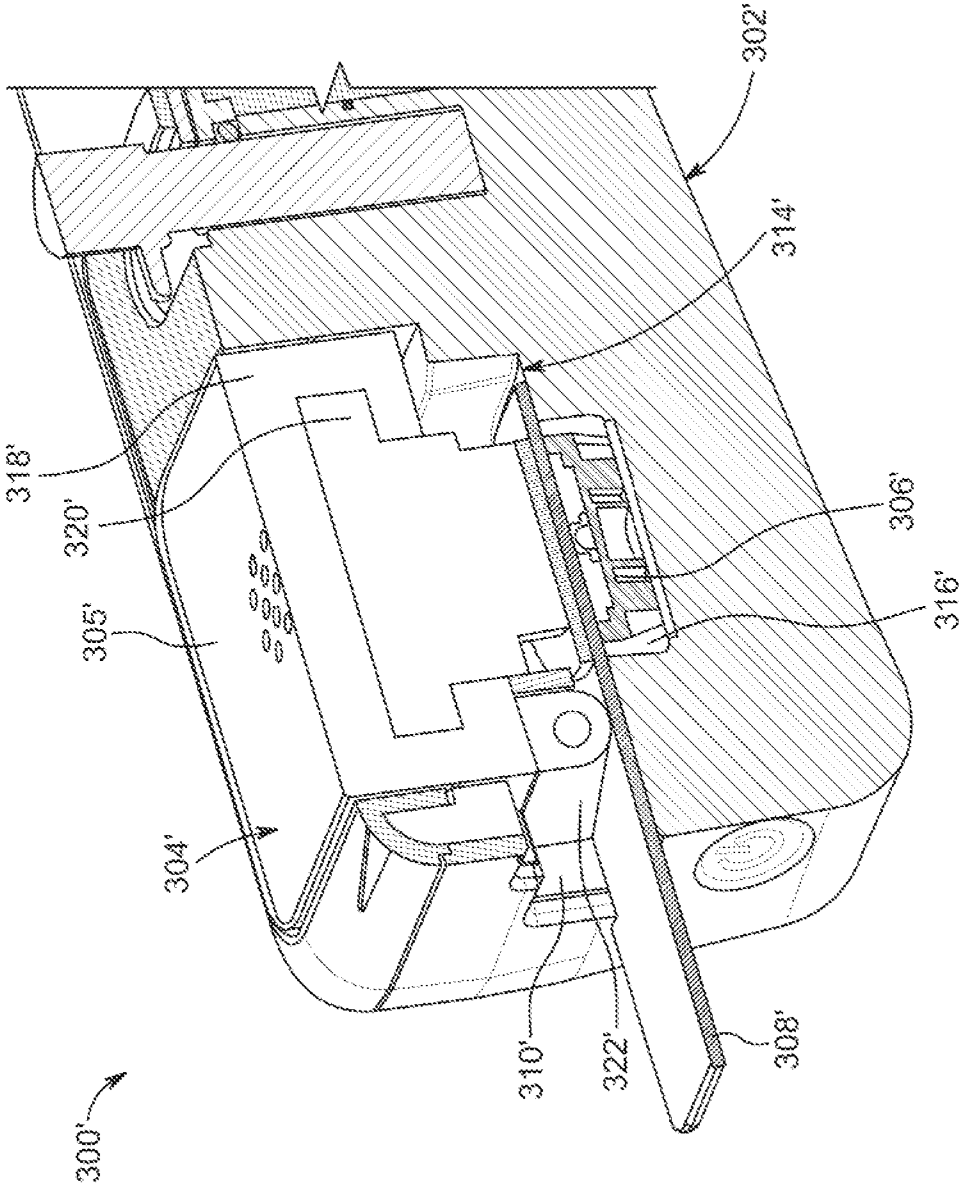
FIG. 3B shows a side-sectional view of salient components of the hand-held detection device of FIG. 3A, except the cartridge is loaded inside the hand-held detection device.

To this end, FIG. 3B is a side-sectional view showing certain internal components of a system 300' for sealing off a removable cartridge, with a compression assembly 304' of device 302' in a "closed" or "compressed" state, according to one embodiment of the present arrangements. In FIG. 3B, system 300', a device 302', a compression assembly 304', a pressing surface 305', a cartridge card 306', a cartridge 308', a cartridge inlet 310', a cartridge stage 314', a cartridge-receiving aperture 316', a retractable housing 318', a compression module 320', and an ingress seal 322', are substantially similar to their counterparts in FIG. 3A, i.e., system 300, device 302, compression assembly 304, pressing surface 305, cartridge card 306, cartridge 308, cartridge inlet 310, cartridge stage 314, cartridge-receiving aperture 316, retractable housing 318, compression module 320, and ingress seal 322.

As shown in in the embodiment of FIG. 3B, cartridge 306' is secured in cartridge aperture 316', which is a part of cartridge stage 314'. In other embodiments of the present arrangements, however, cartridge aperture 316' is not used and cartridge 306' is secured by other means to cartridge stage 314'.

Compression module 320' of compression assembly 304' is shown compressing, and as result, sealing off, cartridge 306'.

As shown in FIG. 3B, ingress seal 322', in conjunction with cartridge stage 314', seals off access through cartridge stage 314'. Preferably, ingress seal 322' is comprised of compressible material sufficient to seal access through cartridge state 314' when ingress seal 322' presses against an uneven or soft surface. Use of ingress seal 322' provides the advantage of sealing interior components of device 302', including cartridge 306', from ambient conditions and from particles such as dust or debris that may interfere with reactions carried out in cartridge 306', or that may otherwise disrupt or damage other internal components of device 302'.

Figure 4A:
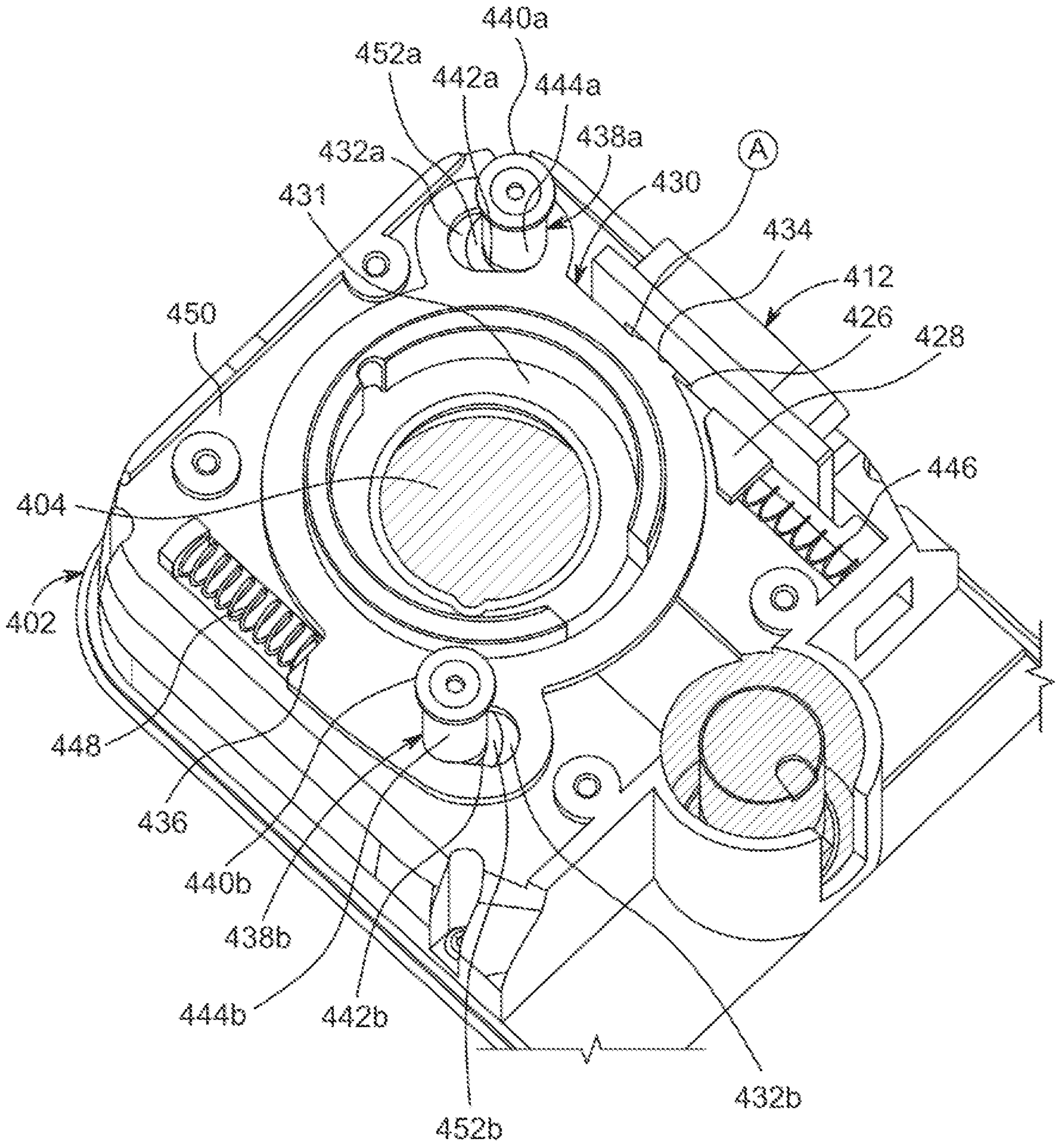
FIG. 4A shows a perspective view of certain salient components of a compression module, according to one embodiment of the present arrangements, shown in a compressed state or an operational state, but in the absence of a cartridge (not shown to simplify illustration).

FIG. 4A shows a perspective view (viewed from a side opposite to pressing surface, e.g., pressing surface 105 of FIG. 1) of salient components, according to one preferred embodiment of the present arrangements, of a hand-held detection device 402 and that are used to transform a compression assembly 404 inside device 402 between a non-operational and an operational or a compressed state. FIG. 4A includes a switch 412 (which is substantially similar to its counterpart in FIG. 1, i.e., switch 112) having a locking aperture 426 and an engaging end 428; a locking plate 430 having a central aperture 431, guide-post-engaging apertures 432*a* and 432*b* disposed on opposite ends of locking plate 430, a protruding portion 434 engaged with locking aperture 426, and a spring-engaging end 436; guide posts 438*a* and 438*b* (extending through apertures 432*a* and 432*b*, respectively), having washers 440*a* and 440*b*, grooves 442*a* and 442*b*, and shafts 444*a* and 444*b*, respectively, and bearings 452*a* and 452*b* disposed thereon, respectively; and a switch frame 450 coupled to switch 412 and locking plate 430 and having disposed thereon a first horizontal spring 446 engaged with engaging end 428 and a second horizontal spring 448 engaging with spring-engaging end 436. FIG. 4A also shows a compression assembly 404. According to the embodiment of FIG. 4A, device 402 and compression assembly 404 are in a compressed, or operational, state. In the perspective shown in FIG. 4A, hatches show the region of compression assembly 404 that contacts or compresses a cartridge during an operational state of compression assembly 404. Preferably, the region of compression assembly 404 that compresses a cartridge (e.g., cartridge 306' of FIG. 3B) is part of a compression module (e.g., compression module 320' of FIG. 3B).

Switch 412 has an engaging end coupled to first horizontal spring 446 and has defined therein a locking aperture occupied by protruding portion 434 of locking plate 430, which is communicatively coupled to a pressing surface of device 402 (e.g., pressing surface 305' of FIG. 3B). According to the embodiment of FIG. 4B, an external switching force may be applied to switch 412 towards first horizontal spring 446 such that switch 412 undergoes displacement, causing locking aperture 426 of switch 412 to displace protruding portion 434 of locking plate 430, which in turn disengages inner edges of guide-post-engaging apertures 432*a* and 432*b* from grooves 442*a* and 442*b*, respectively, to transform compression assembly 404 of FIG. 4A to a non-operational state (as shown in FIG. 4B).

First horizontal spring 446 (and second horizontal spring 448) are considered "horizontal" relative to a plane that is parallel to a cartridge stage of the cartridge secured inside device 402 (not shown in FIG. 4A).

Guide-post-engaging apertures 432*a* and 432*b* each have passing therethrough guide posts 438*a* and 438*b*, respectively. Preferably, guide posts 438*a* and 438*b* are connected to a pressing surface of device 402 (e.g., pressing surface 305' of FIG. 3B), which is not visible in FIG. 4A.

As shown in the embodiment of FIG. 4A, shafts 448*a* and 448*b* of guide posts 438*a* and 438*b*, respectively, each has substantially circumferentially defined thereon grooves 442*a* and 442*b*, respectively. In turn, inner edges of guide-post-engaging apertures 432*a* and 432*b*, respectively, engage with grooves 442*a* and 442*b*, respectively, to maintain the compressed state of compression assembly 404, as shown in FIG. 4A.

Figure 5A:
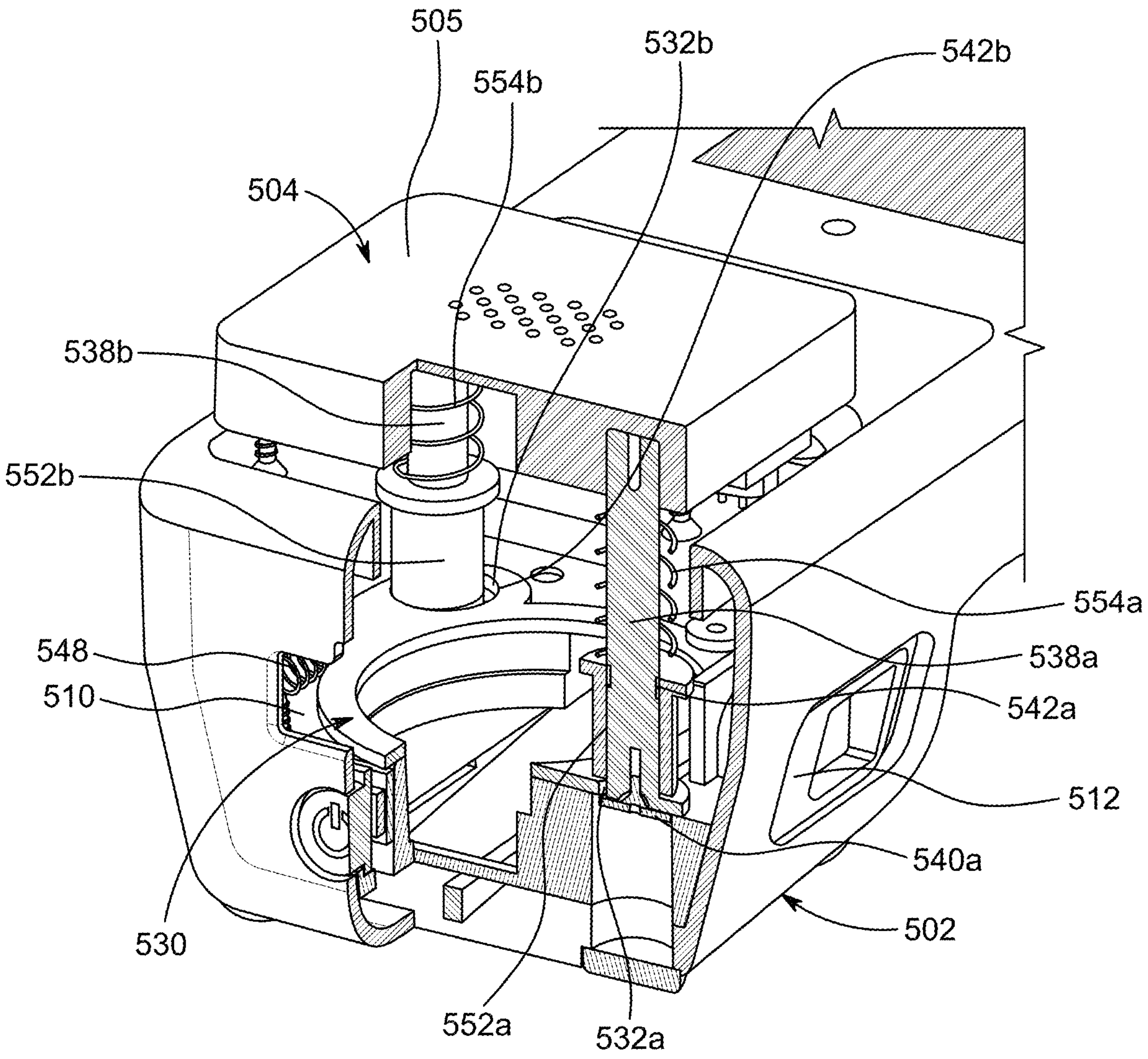
FIG. 5A shows a partial cutaway view of certain salient components of the hand-held detection device of FIG. 4B, including a portion of the compression assembly in the non-operational state having a pressing surface in an open state.

Each of shafts 444*a* and 444*b* has secured thereon bearings 452*a* and 452*b*, respectively, and a vertical spring disposed therearound (not visible in FIG. 4A), which is disposed between bearings 452*a* and 452*b* and a pressing surface of FIG. 4A (as shown with reference to vertical springs 554*a* and 554*b* in FIG. 5A). Preferably, bearings 452*a* and 452*b* are designed not to vertically displace with vertical displacement of guide posts 438*a* and 438*b*, respectively. In other words, bearings 452*a* and 452*b* are fixed relative to guide posts 438*a* and 438b, and are configured such that bearings 452*a* and 452*b* are designed to guide vertical displacement of guide posts 438*a* and 438*b*, respectively, during transformation between non-operational and operational states of compression assembly 404. As compression assembly 404 shown in FIG. 4A acquires an operational state, vertical springs undergo compression between bearing 452*a* and 452*b* and a pressing surface (as shown with reference to vertical springs 554*a*' and 554*b*' and pressing surface 505' in FIG. 5B).

Switch frame 450 is disposed adjacent to locking plate 430 and preferably houses at least a portion of switch 412, and bearings 452*a* and 452*b*. Switch frame 450 also includes vertical displacement apertures (not identified in FIG. 4A to simplify illustration) through which guide posts 438*a* and 438*b* undergo vertical displacement as compression assembly 404 transitions between a non-operational state and an operational state.

As shown in the operational state of compression assembly 404 in FIG. 4A, inner edges of apertures 432*a* and 432*b* engage with grooves 442*a* and 442*b*, respectively, to prevent vertical displacement of the guide posts. In other words, engagement between apertures 432*a* and 432*b* and grooves 442*a* and 442*b*, respectively, maintain device 402 and compression assembly 404 in a compression state. To this end, vertical springs on guideposts 432*a* and 432*b* operate to spring load each of guide posts 432*a* and 432*b*, respectively. In other words, the vertical springs are spring loaded, but they are prevented from driving vertical displacement of guide posts 432*a* and 432*b* by engagement of locking plate apertures 432*a* and 432*b* with grooves 442*a* and 442*b*, respectively.

Switch frame 450 also houses second horizontal spring 448, which engages with spring-engaging end 436 of locking plate 430. In the compressed state of compression assembly 404, a spring loading action of second horizontal spring 448 maintains engagement of guide-post-engaging apertures 432*a* and 432*b* with grooves 442*a* and 442*b*, respectively. In other words, during a compression state of device 402 and compression assembly 404, spring loading of second horizontal spring 448 (which may be considered horizontal relative to a plane parallel to a cartridge stage)

provides force sufficient to maintain engagement of grooves 442*a* and 442*b* with guide-post-engaging apertures 432*a* and 432*b*, respectively.

Upon receiving incidental pressing forces or contact at any surface of device 402, including pressing surface 405, such as when device 403 is accidentally dropped, the present arrangements prevent device 402 from transitioning from an operational state to a non-operational state. Specifically, upon receiving such incidental pressing force, the inner edges of the guide-post-engaging apertures do not disengage from the grooves of the shaft of the guide posts. To this end, FIG. 4A shows a gap (denoted by location "A") defined in locking aperture to tolerate such incidental pressing forces or contact.

Central aperture 431 of locking plate 430 is preferably part of an optical pathway designed to allow for optical detection of a target analyte disposed inside a cartridge (e.g., cartridge 306' of FIG. 3B).

Figure 4B:
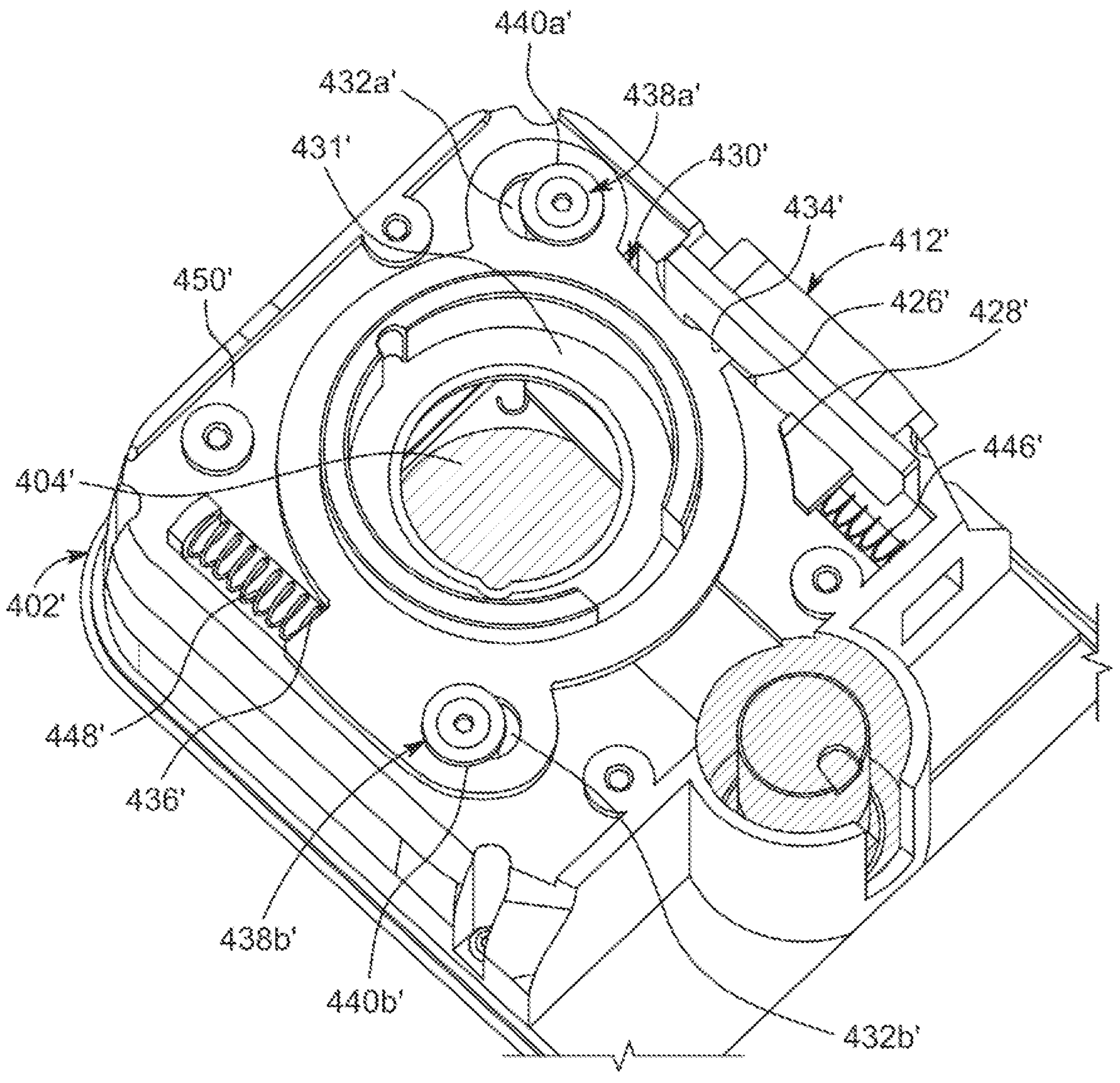
FIG. 4B shows a perspective view of certain salient components of a compression module of FIG. 4A, except the compression module is in a non-operational state in the absence of a cartridge (not shown to simplify illustration).

FIG. 4B shows a perspective view of salient components, according to one embodiment of the present arrangements, used to transform a compression assembly between an operational state to a non-operational state. Device 402' is the same as device 402 of FIG. 4A, except compression assembly 404' of device 402' is shown in a non-operational state.

In FIG. 4B, device 402', a switch 412', compression assembly 404', a locking aperture 426', an engaging end 428', a locking plate 430', a central aperture 431', guide-post-engaging apertures 432*a*' and 432*b*', a protruding portion 434', a spring-engaging end 436', guide posts 438*a*' and 438*b*', washers 440*a*' and 440*b*', a first horizontal spring 446', a second horizontal spring 448', a switch frame 450', and bearings 452*a*' and 452*b*', are substantially similar to their counterparts in FIG. 4A, i.e., device 402, switch 412, compression assembly 404, locking aperture 426, engaging end 428; locking plate 430, central aperture 431, guide-post-engaging apertures 432*a* and 432*b*, protruding portion 434, spring-engaging end 436, guide posts 438*a* and 438*b*, washers 440*a* and 440*b*, first horizontal spring 446, second horizontal spring 448, a switch frame 450, and bearings 452*a* and 452*b*.

According to the embodiment of FIG. 4B, switch 412', upon receiving an external switching force, places a pressing surface (not visible in FIG. 4B) in an open state and compression assembly 404' in a non-operational state.

Preferably, switch 412' is designed to return from a new position (i.e., when a switching force is applied) to an original position under a spring unloading action of first horizontal spring 446' upon cessation of the external switching force.

As shown in FIG. 4B, inner edges of guide-post-engaging apertures 432*a*' and 432*b*' have undergone disengagement from grooves (e.g., grooves 442*a* and 442*b* of FIG. 4A), allowing vertical displacement of guide posts 438*a*' and 438*b*', and vertical springs undergo decompression, springing a pressing surface to acquire an open state.

In a similar manner, when a pressing surface is released from closed state to an open state, at least a portion of compression assembly 404' is displaced away from a cartridge stage (not shown in FIG. 4B), allowing a cartridge access through an unobstructed loading path to be secured on the cartridge stage. To this end, compression assembly 404' of FIG. 4B is shown displaced away a cartridge stage (which is disposed adjacent to locking plate 430') relative to a location of compression assembly 404 of FIG. 4A.

Likewise, though pressing surfaces are not visible in FIGS. 4A and 4B, FIG. 4A shows an open state of a pressing surface on compression assembly 4A (e.g., pressing surface 305 of FIG. 3A) and FIG. 4B shows a closed state of a pressing surface on compression assembly 4B (e.g., pressing surface 305' of FIG. 3B).

As shown in FIG. 4B, a spring loading action of second horizontal spring 448' maintains engagement of guide-post-engaging apertures with shafts on guideposts 438*a*' and 438*b*'.

Figure 5B:
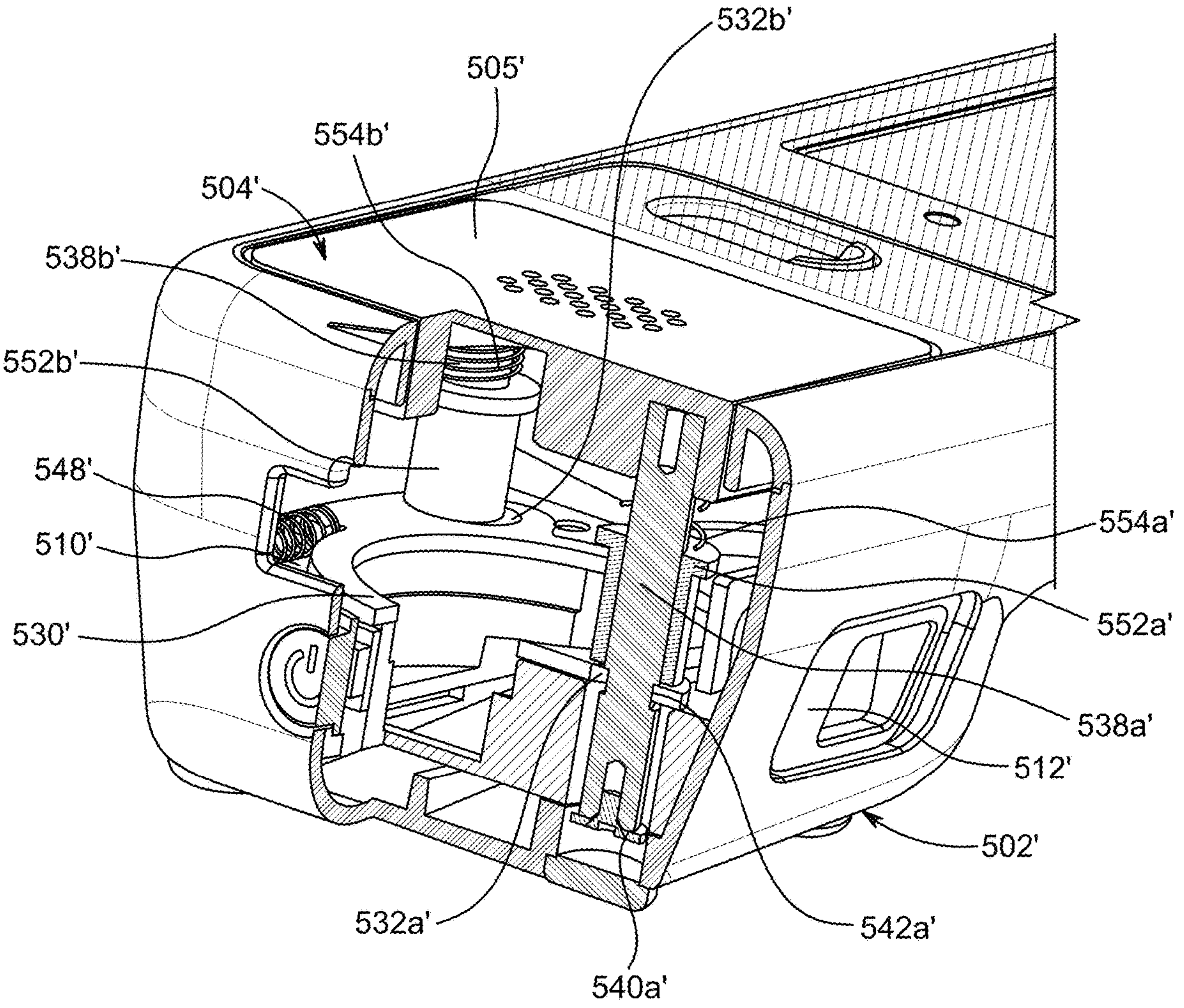
FIG. 5B shows a partial cutaway view of certain salient components of the hand-held detection device of FIG. 5A, including the compression assembly in an operational state where the pressing surface in a closed state after receiving an external pressing force.

FIG. 5A is a cross-sectional view of certain salient components of a hand-held analyte-detection device 502, according to one embodiment of the present arrangements, for transforming a compression assembly 504 between operational and non-operational states. FIG. 5A shows device 502 with a pressing surface 505 in a closed state, according to one embodiment of the present arrangements. FIG. 5B includes device 502, a compression assembly 504, pressing surface 505, a switch 512, compressing assembly 504, a locking plate 530 with guide-post engaging apertures 532*a* and 532*b*, guideposts 538*a* and 538*b*, a second horizontal spring 548, bearings 552*a* and 552*b*, and a washer 540*a*, which are substantially similar to their counterparts in FIG. 4B, i.e., device 402', switch 412', compression assembly 404', locking plate 430' with guide-post engaging apertures 432*a*' and 432*b*', guideposts 438*a*' and 438*b*', bearings 452*a*' and 452*b*', second horizontal spring 448', and washer 440*a*'. FIG. 5A also shows a pressing surface 505 and a cartridge inlet 510, which are substantially similar to their counterparts in FIG. 2B, i.e., pressing surface 205' and cartridge inlet 210'. FIG. 5A also shows vertical springs 554*a* and 554*b* disposed between bearings 552*a* and 552*b*, respectively, and pressing surface 505. Grooves 542*a* and 542*b* are substantially similar to the counterparts in FIG. 4*a*, i.e., grooves 442*a* and 442*b*.

FIG. 5B shows the device of FIG. 5A with a pressing surface 505' in a closed state, according to one embodiment of the present arrangements. FIG. 5B includes a device 502', a switch 512', a compression assembly 504' with a pressing surface 505', a cartridge inlet 510', a locking plate 530' with guide-post engaging apertures 532*a*' and 532*b*', guideposts 538*a*' and 538*b*', second horizontal spring 548', groove 542*a*', bearings 552*a*' and 552*b*', vertical springs 554*a*' and 554*b*', and a washer 540*a*', which are substantially similar to their counterparts in FIG. 5A, i.e., device 502, switch 512, compression assembly 504 with pressing surface 505, cartridge inlet 510, locking plate 530 with guide-post engaging apertures 532*a* and 532*b*, guideposts 538*a* and 538*b*, groove 442*a*, second horizontal spring 548, bearings 552*a* and 552*b*, vertical springs 554*a* and 554*b*, and washer 540*a*.

As shown in FIGS. 5A and 5B, pressing surface 505 and 505', respectively, are connected to guide posts 538*a* and 538*b* (FIG. 5A) and 538*a*' and 538*b*' (FIG. 5B), respectively, with each of the guide posts comprising a washer (e.g., washer 440*a* of FIG. 5A and washer 440*a*' of FIG. 5*b*, respectively) disposed at one end of the shafts on the guideposts (e.g., the shaft of guide post 538*a* of FIG. 5A and the shaft of guide post 538*a*' of FIG. 5B). As shown in the open state of pressing surface 505' of FIG. 5B, presence of washer 440*a* prevents vertical displacement of a shaft on guide post 538*a* (e.g., shaft 444*a* of guide post 438*a* of FIG. 4A) beyond a position of guide-post-engaging aperture 532*a* of locking plate 530, such that pressing surface 505 remains coupled to locking plate 530 when pressing surface 505 of device 502 is in an open state. In certain embodiments of the present arrangements, such prevention of displacement of guidepost 538*a* by washer 540*a* prevents compression assembly 504 and guide posts 548*a* and 548*b* from being detached or separated from other components of device 502.

In preferred embodiments of the present arrangements, each of guide posts 538*a* and 538*b* have disposed there-around bearings 552*a* and 552*b* and vertical springs 554*a* and 554*b*, respectively, each of which vertical spring is disposed between bearing 552*a* and 552*b*, respectively, and pressing surface 505.

Bearings 552*a* and 552*b* are designed not to vertically displace with vertical displacement of guide posts 538*a* and 538*b*, respectively. In other words, bearings 552*a* and 552*b* are fixed relative to guide posts 538*a* and 538*b*, respectively, and are configured to allow vertical displacement of guide posts 538*a* and 538*b*, respectively, when a compression assembly transitions from a non-operational state (as shown by compression assembly 504 of FIG. 5A) to an operational state (as shown by compression assembly 504' of FIG. 5B). In certain embodiments of the present arrangements, bearings 552*a* and 552*b* are fixed by connection or coupling to features located on a switch frame (e.g., switch frame 450 of FIG. 4A).

As shown in FIG. 5B with reference to an operational state of compression assembly 504', vertical springs 554*a'* and 554*b'* undergo compression between bearings 552*a'* and 552*b'*, respectively, and pressing surface 505'. Likewise, as shown in FIG. 5A, when compression assembly 504' transitions to a non-operational state (as shown by compression assembly 504 of FIG. 5A), vertical springs 554*a* and 554*b* undergo decompression between bearings 552*a* and 552*b*, respectively, and pressing surface 504.

When compression assembly 504*b* is in an operational state, as shown in FIG. 5B, inner edges of guide-post-engaging apertures 532*a'* and 532*b'*, respectively, engage with grooves 542*a'* and a groove defined on guide post 538*b'* (not visible in FIG. 5B), respectively, to prevent vertical displacement of guide posts 538*a'* and 538*b'*, respectively, such that vertical springs 554*a'* and 554*b'* operate to spring load guide posts 538*a'* and 538*b'*, respectively.

As shown in FIG. 5B, when the compression assembly transitions to a non-operational state (as shown by compression assembly 505 of FIG. 5A), inner edges of guide-post-engaging apertures 532*a* and 532*b* undergo disengagement from grooves 542*a* and a grooved defined on guide post 538*b* (not visible in FIG. 5A), allowing vertical displacement of guide posts 538*a* and 538*b*, as vertical springs 554*a* and 554*b* undergo decompression, springing pressing surface 505 to acquire an open state of the pressing surface.

Figure 6:
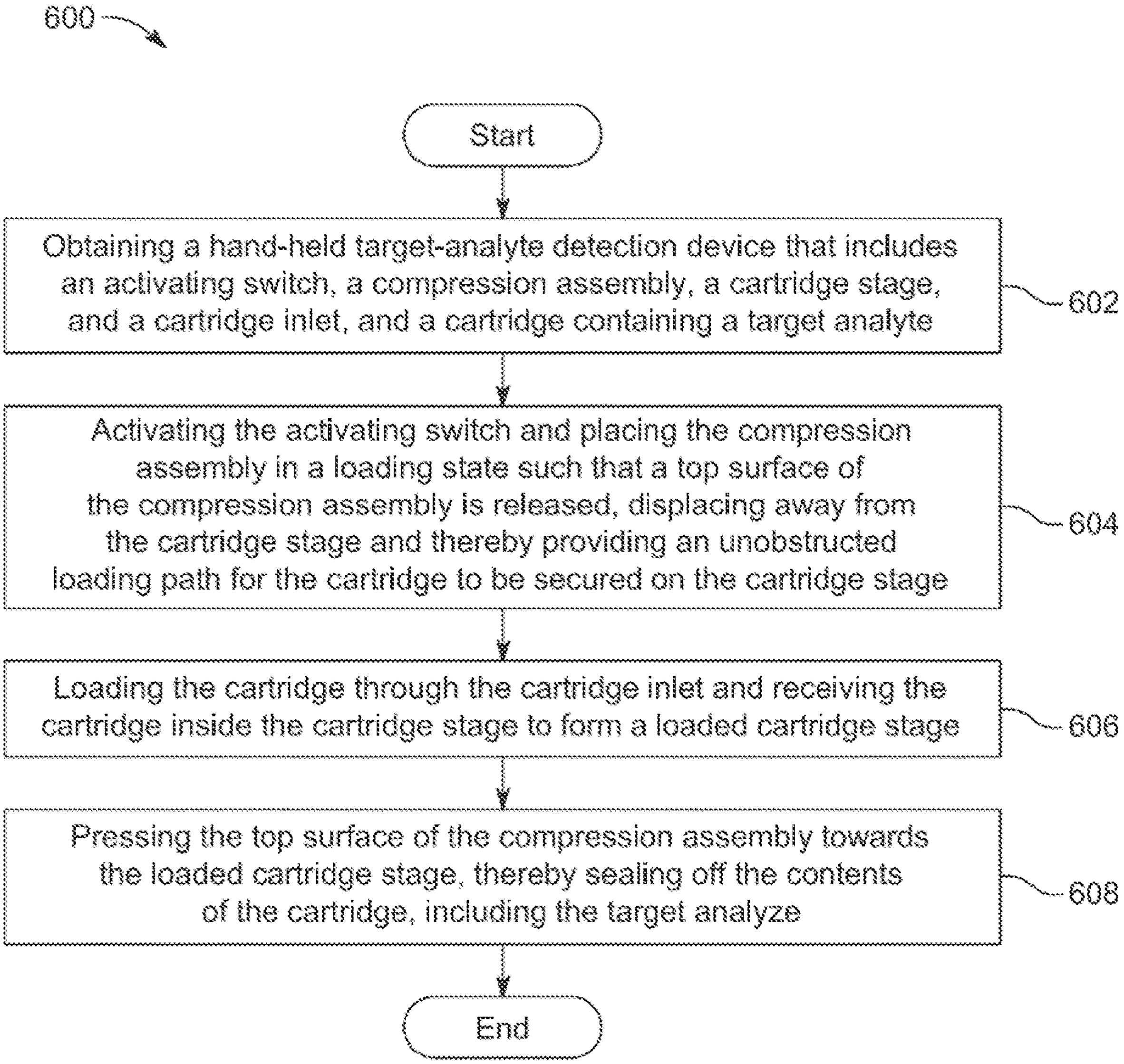
FIG. 6 shows a process flow diagram, according one embodiment of the present teachings, for detecting a target analyte contained in a sample loaded on the cartridge shown in FIGS. 1, 2A and 2B.

FIG. 6 shows a method 600, according to one embodiment of the present teachings, for detecting a target analyte. Method 600, preferably, beings with a step 602, which involves obtaining a hand-held target-analyte detection device and a cartridge containing a target analyte (e.g., device 102 and cartridge 106, respectively, of FIG. 1). The hand-held target-analyte detection device includes a switch (e.g., switch 112 of FIG. 1), a compression assembly (e.g., compression assembly 104 of FIG. 1), a cartridge stage (e.g., cartridge stage 314 of FIG. 3A), and a cartridge inlet (e.g., cartridge inlet 110 of FIG. 1).

Next, a step 604 includes activating the switch and placing the compression assembly in a non-operational state. In this non-operational state, a pressing surface of the compression assembly (e.g., pressing surface 205' of FIG. 2B) is released, displacing away from the cartridge stage and thereby providing an unobstructed loading path for the cartridge to be secured inside the cartridge stage. In other words, in an open state of the pressing surface, the compressional assembly is non-operational and therefore in a non-operational state.

Method 600 then proceeds to a step 606, which includes loading the cartridge through the cartridge inlet (e.g., cartridge inlet 110 of FIG. 1) and receiving the cartridge inside the cartridge stage to form a loaded cartridge stage (e.g., as shown in FIG. 3B with respect to cartridge 306' and cartridge stage 314').

Then, method 600 involves a step 608, which includes pressing the pressing surface of the compression assembly towards the loaded cartridge stage and thereby sealing off access through the cartridge stage. As a result, the pressing step provides a sealed environment for the target analyte inside the cartridge.

In those embodiments of the present arrangements where the compression assembly includes or is coupled to an ingress seal (e.g. ingress seal 322 of FIG. 3A), the above-mentioned pressing step includes forcing the ingress seal towards the cartridge stage to seal off access through the cartridge stage (e.g., as shown in FIG. 3B with respect to ingress seal 322' and cartridge stage 314').

Figure 7:
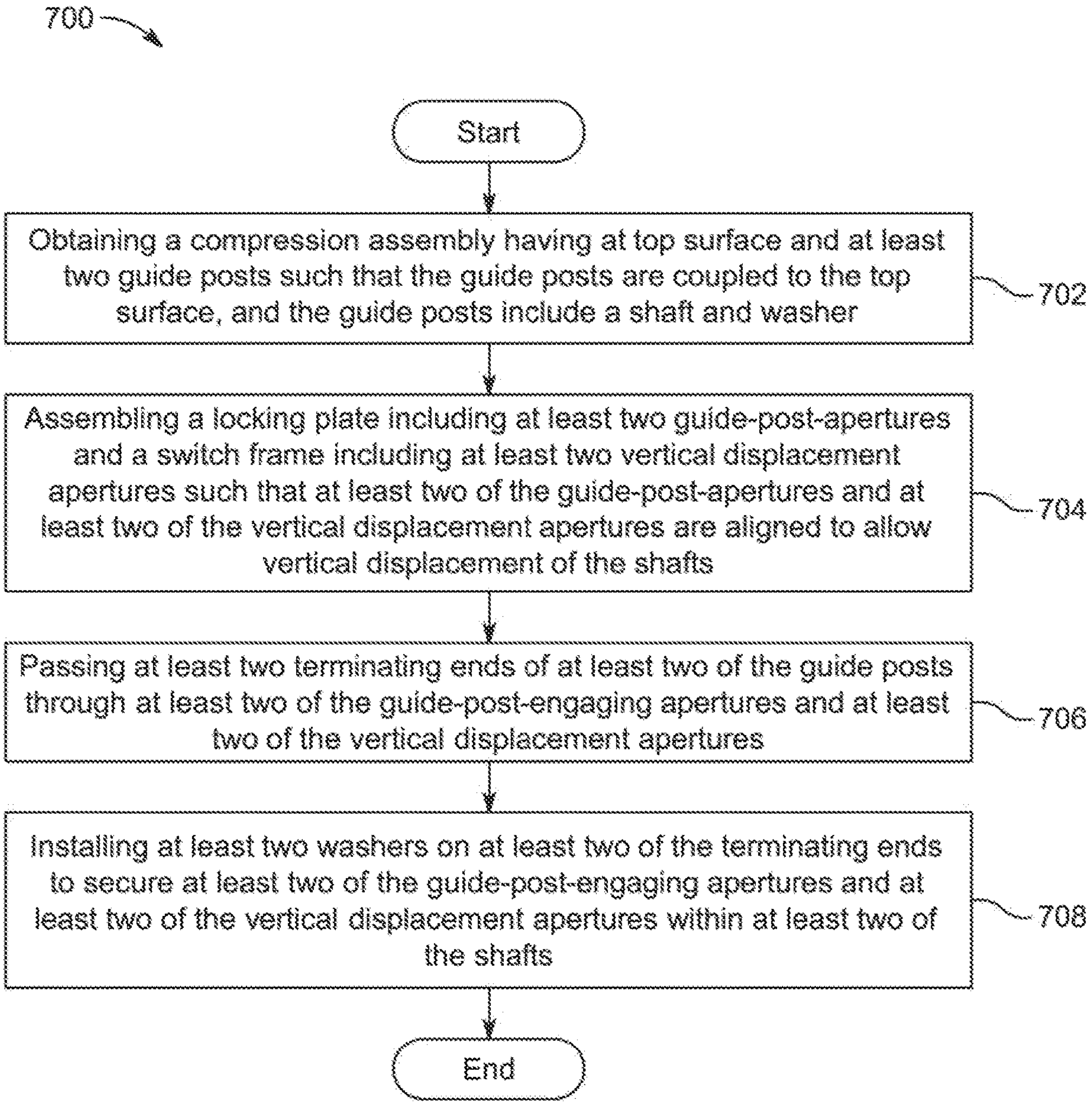
FIG. 7 shows a process flow diagram, according one embodiment of the present teachings, for assembling the hand-held detection device shown in FIGS. 1, 2A, 2B, 2C, 3A, 3B, 4A, 4B, 5A, and 5B.

FIG. 7 shows a method 700, according to one embodiment of the present teachings, for assembling the hand-held detection devices of different present arrangements. Method 700 includes a step 702 of obtaining a compression assembly having at pressing surface and at least two guide posts (e.g., guide posts 438*a* and 438*b* of FIG. 4A). In this configuration of the compression assembly, the guide posts are coupled to the pressing surface and the guide posts include a shaft and washer (e.g., shafts 444*a* and 444*b* and washers 440*a* and 440*b* of FIG. 4A).

Method 700 then involves an assembling step 704, which include assembling a locking plate (e.g., locking plate 430 of FIG. 4A) including at least two guide-post-engaging apertures (e.g., guide-post-engaging apertures 432*a* and 432*b* of FIG. 4A) and a switch frame (e.g., switch frame 450 of FIG. 4A). The switch frame includes at least two vertical displacement apertures such that at least two of the guide-post-engaging apertures and at least two of the vertical displacement apertures are aligned to allow vertical displacement of the shafts.

Next, method 700 proceeds to a step 706, which includes passing at least two terminating ends of at least two of the guide posts through at least two of the guide-post-engaging apertures and at least two of the vertical displacement apertures.

Method 700 may conclude with a step 708, which involves installing at least two washers (e.g., washers 440*a* and 440*b* of FIG. 4A) on at least two of the terminating ends to secure at least two of the guide-post-engaging apertures and at least two of the vertical displacement apertures within at least two of the shafts.

Although illustrative embodiments of the present arrangements and teachings have been shown and described, other modifications, changes, and substitutions are intended. Accordingly, it is appropriate that the appended claims be construed broadly and in a manner consistent with the scope of the disclosure, as set forth in the following claims.

What is claimed is:

1. A system for detecting a target analyte, said system comprising:

a cartridge for detecting said target analyte, wherein said cartridge includes a cap portion and a base portion; and a hand-held device for sealing off said cartridge, comprising:

a cartridge inlet designed to receive said cartridge, wherein said cartridge inlet is an opening defined on one end of said hand-held device;

a cartridge stage that includes a horizontal surface that is coupled to or extending from said cartridge inlet and having a cartridge-receiving aperture, wherein said cartridge- receiving aperture is designed to have secured therein said base portion of said cartridge;

a compression assembly disposed adjacent to said cartridge stage comprising:

a retractable housing that includes a pressing surface capable of acquiring an open state; and a compression module coupled to said retractable housing with a surface configured to compress said cap portion of said cartridge, wherein said pressing surface is capable of being released from a closed state and thereby displaces at least a portion of said compression assembly away from said cartridge stage, allowing a said cartridge access through an unobstructed loading path to be secured on said cartridge stage, and wherein upon receiving an external pressing force on said pressing surface, said compression assembly being designed to acquire a compressed state, in which said pressing surface displaces towards said cartridge stage and thereby displaces said portion of said compression assembly towards said cartridge stage and thereby allowing said compression assembly to seal off said cartridge present inside said cartridge stage from an environment around said cartridge stage; and a switch, having an engaging end coupled to a first horizontal spring and has defined therein a locking aperture occupied by a protruding portion of a locking plate, said switch being communicatively coupled to said pressing surface of said compression assembly such that upon receiving an external switching force, said switch places said pressing surface in an open state and said compression assembly in a non-operational state, and wherein when said pressing surface receiving an external pressing force to acquire a closed state, said pressing surface places said compression assembly in said compressed state;

and wherein said cartridge is removable from said hand-held device.

2. The system for detecting a target analyte of claim 1, wherein in said compressed state of said compression assembly, said cartridge-receiving aperture prevents displacement of said removable cartridge under compression.

3. The system for detecting a target analyte of claim 2, wherein said locking plate has defined therein a central aperture and at least two guide-posting-engaging apertures, and wherein said central aperture is part of an optical pathway designed to allow for optical detection of a target analyte disposed inside said cartridge, and each of said two guide-post-engaging apertures is disposed adjacent to said central aperture and both of which have passing therethrough a guide posts that are connected to said pressing surface.

4. The system for detecting a target analyte of claim 3, wherein said pressing surface is connected to at least two of said guide posts, each of which comprises a washer and a shaft, wherein said washers are disposed at one end of said shafts and said shafts pass through said guide-post-engaging apertures, and wherein, in said open state of said pressing surface, presence of said washer prevents vertical displacement of said shaft beyond a position of said guide-post-engaging aperture such that said pressing surface remains coupled to said compression assembly during said open state of said pressing surface.

5. The system for detecting a target analyte of claim 1, wherein said compression assembly includes a compression module and a retractable housing including said pressing surface, and said retractable housing is coupled to and houses at least a portion of said compression module such that upon receiving said external pressing force on said pressing surface, said compression module acquires said compressed state, in which said compression module seals off said cartridge present inside said cartridge stage, and wherein said guide posts are housed inside said retractable housing.

6. The system for detecting a target analyte of claim 5, further comprising an ingress seal coupled to said retractable housing such that when said compression assembly is in said compressed state, said ingress seal operates in conjunction with said cartridge stage to seal off access through said cartridge stage.

7. The system for detecting a target analyte of claim 4, wherein said shaft has substantially circumferentially defined thereon at least one groove such that, in said compressed state of said compression assembly, inner edges of each of said guide-post-engaging apertures engage with respective ones of said grooves to maintain said compressed state of said compression assembly.

8. The system for detecting a target analyte of claim 7, wherein each of said guide posts have disposed therearound a bearing and a vertical spring, which is disposed between said bearing and said pressing surface, wherein said bearings are designed to not vertically displace with vertical displacement of said guide posts, and said bearings are designed to guide vertical displacement of said guide posts, and wherein when said compression assembly transitions from said non-operational state to said operational state, said vertical springs undergo compression between said bearing and said pressing surface, and wherein when said compression assembly transitions from said operational state to said non-operational state, said vertical springs undergo decompression between said bearing and said pressing surface.

9. The system for detecting a target analyte of claim 8, further comprising a switch frame disposed adjacent to said locking plate and housing therein at least a portion of said switch, and said bearing and said vertical spring disposed between said pressing surface and said switch frame, and wherein said switch frame having defined therein vertical displacement apertures through which said guide posts undergo vertical displacement as said compression assembly transitions between said non-operational state and said operational state.

10. The system for detecting a target analyte of claim 9, wherein in said operational state of said compression assembly, said inner edges of said guide-post-engaging apertures engage with said grooves defined on said guide posts to prevent vertical displacement of said guide posts and said vertical springs operate to spring load said respective one of said guide posts, and wherein when said compression assembly transitions from said operational state to said non-operational state, said inner edges of said guide-post-engaging apertures undergo disengagement from said grooves, allowing vertical displacement of said guide posts and said vertical springs undergo decompression, springing said pressing surface to acquire said open state.

11. The system for detecting a target analyte of claim 10, wherein when said compression assembly transitions from said operational state to said non-operational state, said switch undergoes displacement such that said locking aperture of said switch displaces said protruding portion of said locking plate, which in turn disengages inner edges of said guide-post-engaging apertures from said grooves of said guide posts.

12. The system for detecting a target analyte of claim 11, wherein said switch frame houses said first horizontal spring coupled to said switch, and when said switch receives said external switching force and is displaced from its original position to a new position, said engaging end causes spring loading of said first horizontal spring and almost contemporaneously, causes displacement of said locking aperture, which in turn causes displacement of said protruding portion, which in turn disengages said inner edges of said guide-post-engaging apertures from said grooves.

13. The system for detecting a target analyte of claim 12, wherein said switch is designed to return from said new position to said original position under a spring unloading action of said first horizontal spring upon cessation of said external switching force.

14. The system for detecting a target analyte of claim 13, wherein said switch frame houses a second horizontal spring that engages with a spring engaging end of said locking plate such that in said compressed state of said compression assembly, a spring loading action of said second horizontal spring maintains engagement of said guide-post-engaging apertures of said locking plate with said grooves.

15. The system for detecting a target analyte of claim 14, wherein in said open state of said pressing surface or said non-operational state of said compression assembly, said spring loading action of said second horizontal spring maintains engagement of said guide-post-engaging apertures with said shafts.

16. The system for detecting a target analyte of claim 15, wherein upon receiving said external pressing force at said pressing surface, said grooves of said shaft of said guide posts vertically displace towards said locking plate until said grooves engage with inner edge of said guide-post-engaging apertures of said locking plate, and wherein said spring loading action of said second horizontal spring forces engagement of said grooves with inner edges of said guide-post-engaging apertures.

* * * * *